United States Patent
Pease

(10) Patent No.: US 6,438,010 B1
(45) Date of Patent: Aug. 20, 2002

(54) DRIVE CIRCUITS FOR MICROELECTROMECHANICAL SYSTEMS DEVICES

(75) Inventor: John S. Pease, Santa Clara, CA (US)

(73) Assignee: Onetta, Inc., Sunnyvale, CA (US)

( * ) Notice: Subject to any disclaimer, the term of this patent is extended or adjusted under 35 U.S.C. 154(b) by 0 days.

(21) Appl. No.: 09/814,063

(22) Filed: Mar. 22, 2001

Related U.S. Application Data

(60) Provisional application No. 60/272,298, filed on Mar. 2, 2001.

(51) Int. Cl.$^7$ .............................. B81B 7/02; B81B 7/04; H02M 1/00
(52) U.S. Cl. ...................................... 363/147
(58) Field of Search ................. 333/186, 189; 257/431; 363/147

(56) References Cited

U.S. PATENT DOCUMENTS

| | | | |
|---|---|---|---|
| 5,253,104 A | | 10/1993 | Delavaux .................... 359/341 |
| 5,537,083 A | * | 7/1996 | Lin et al. .................... 333/186 |
| 5,659,195 A | * | 8/1997 | Kaiser et al. ................ 257/415 |
| 5,861,981 A | | 1/1999 | Jabr ........................... 359/341 |
| 5,864,581 A | | 1/1999 | Alger-Meunier et al. ... 375/224 |
| 5,933,552 A | | 8/1999 | Fukushima et al. .......... 385/24 |
| 5,943,223 A | * | 8/1999 | Pond ............................ 363/53 |
| 5,969,834 A | | 10/1999 | Farber et al. ................. 359/110 |
| 6,016,213 A | | 1/2000 | Farber et al. ................. 359/177 |
| 6,061,171 A | | 5/2000 | Taylor et al. ................. 359/341 |
| 6,115,174 A | | 9/2000 | Grubb et al. ................. 359/334 |
| 6,127,811 A | * | 10/2000 | Shenoy et al. ............... 320/166 |
| 6,151,157 A | | 11/2000 | Ball et al. .................... 359/341 |
| 6,160,659 A | | 12/2000 | Kinoshita .................... 359/337 |
| 6,198,570 B1 | | 3/2001 | Fukushima et al. ......... 359/337 |
| 6,215,581 B1 | | 4/2001 | Yadlowsky .................. 359/337 |
| 6,311,555 B1 | * | 11/2001 | McCall et al. ................ 73/488 |

FOREIGN PATENT DOCUMENTS

| | | |
|---|---|---|
| EP | 762 667 A2 | 3/1997 |
| JP | 11-275027 | 8/1999 |
| WO | WO 97/28584 | 8/1997 |
| WO | WO 99/66607 | 12/1999 |
| WO | WO 99/67609 | 12/1999 |
| WO | WO 00/4613 A1 | 1/2000 |
| WO | WO 00/14909 | 3/2000 |
| WO | WO 00/49721 | 8/2000 |

OTHER PUBLICATIONS

Zhu et al. "1.28 Tbit/s (31 x 40 Gbit/s) Transmission over 1000 km NDSF Employing Distributed Raman Amplification and Active Gain Flattening" Electronics Letters, vol. 37, No. 1, pp. 43–45 (Jan. 4, 2001).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Takeda et al. "Active Gain Tilt Equalization by Preferentially 1.43 $\mu$m–or 1.48$\mu$m–Pumped Raman Amplification" OSA Optical Amplifiers and their Applications, vol. 30, pp. 101–105 (1999). No month.

* cited by examiner

Primary Examiner—Shawn Riley
(74) Attorney, Agent, or Firm—Fish & Neave; G. Victor Treyz

(57) ABSTRACT

Circuitry for generating AC signals is provided. The circuitry may be used to produce AC drive signals for microelectromechanical systems (MEMS) devices such as MEMS devices used in fiber-optic communications network equipment. The circuitry may include an amplitude controller for producing a DC voltage, a waveform generator for producing an AC waveform having an amplitude proportional to the DC voltage, and a transformer for boosting the AC waveform to produce the AC drive signals.

23 Claims, 6 Drawing Sheets

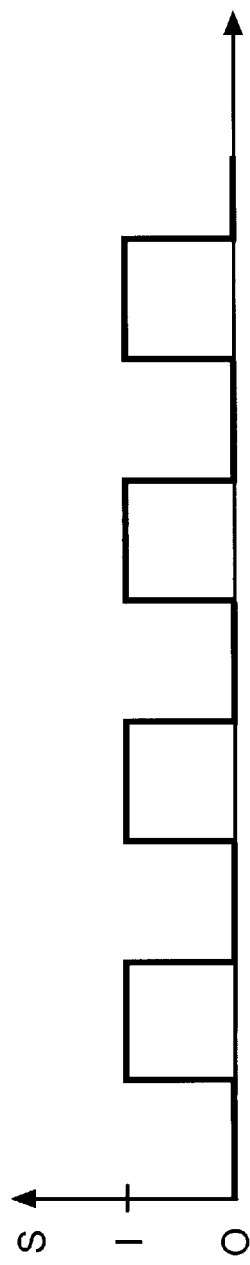
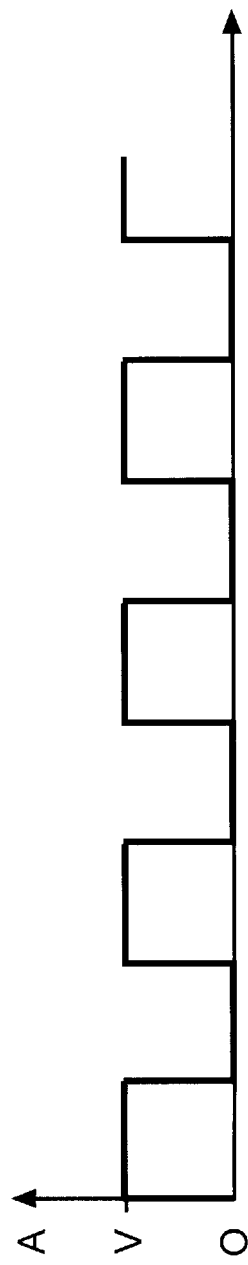
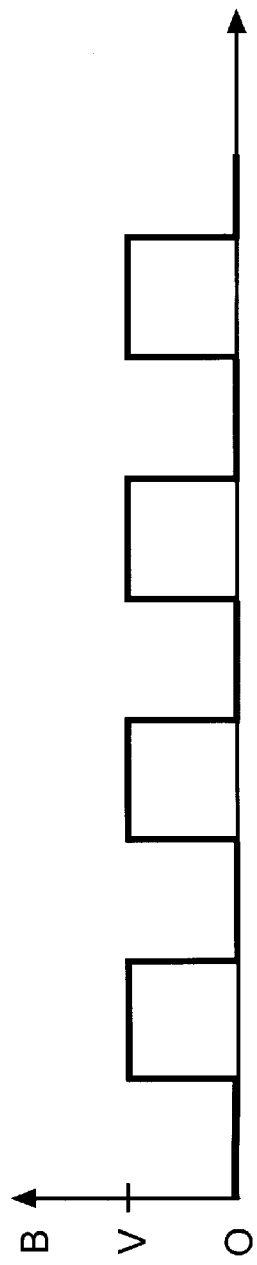
FIG. 4a
FIG. 4b
FIG. 4c

DRIVE CIRCUITS FOR MICROELECTROMECHANICAL SYSTEMS DEVICES This application claims the benefit of provisional patent application No. 60/272,298, filed Mar. 2, 2001.

BACKGROUND OF THE INVENTION

The present invention relates to microelectromechanical systems devices, and more particularly, to drive circuitry for microelectromechanical systems devices and other applications.

Microelectromechanical systems (MEMS) devices are used in a variety of applications. For example, MEMS devices have been used as variable optical attenuators and dynamic filters in fiber-optic communications equipment. MEMS devices are typically based on one or more miniature movable silicon or silicon-based elements. Semiconductor microfabrication techniques may be used to fabricate MEMS devices.

The position of the movable elements in a MEMS device may be controlled electrostatically using controllable DC drive voltages. It may sometimes be preferred to use AC drive voltages rather than DC drive voltages to reduce drift effects due to unwanted accumulations of charge in portions of the MEMS device. With this approach, the polarity of the voltage that is applied to the MEMS device is continually reversed, but the position of the movable elements may still be controlled by adjusting the magnitude of the drive voltage. The frequency of the AC signal is typically selected to be high enough to avoid creating any undesirable mechanical resonances.

Drive circuits that produce AC signals may also be used in other applications such as applications involving the control of electrical, mechanical, and optical components and test and measurement applications.

It is an object of the present invention to provide circuitry that produces AC signals having a controllable magnitude.

It is also an object of the present invention to provide drive circuits for microelectromechanical system devices.

SUMMARY OF THE INVENTION

These and other objects of the invention are accomplished in accordance with the present invention by providing circuitry that produces AC output signals. The AC output signals may be used as drive signals to control the operation of microelectromechanical systems (MEMS) devices. For example, the circuitry may be used to provide AC drive signals for controlling the operation of MEMS devices used in fiber-optic communications networks.

The AC signals that are produced may have a controllable magnitude. The frequency of the AC signals may be on the order of 100 KHz to 10 MHz or any other suitable frequency. The AC signal waveform may be a square wave or any other suitable waveform.

The circuitry may include a controllable DC voltage source. Waveform generator circuitry may use the DC voltage from the voltage source to produce an AC voltage signal with a controllable amplitude. The waveform generator circuitry may be AC coupled to a transformer, so that only the single controllable voltage from the DC voltage source needs to be used to produce the controllable-amplitude AC voltage signal. The transformer may boost the amplitude of the AC voltage signal so that the boosted signal may be used as a drive signal for a microelectromechanical systems device or other device. The transformer may be housed in a relatively small package such as a surface mount package. A control unit may be used to control the voltage of the drive signal.

Circuitry that generates multiple AC drive signals in parallel may be provided. A control unit may be used to individually control each of the AC drive signals. Multiple DC voltage sources may be used to create individually-controllable DC voltages. Waveform generator circuitry may be provided to convert each of the DC voltages into a corresponding AC voltage signal. The magnitudes of the AC voltage signals may be boosted by transformers. Multiple transformers may be housed in a single package. For example, multiple transformers may be housed in a single DIP-style package. Each AC drive signal may be used to control a different movable or controllable element in a MEMS device.

Further features of the invention and its nature and various advantages will be more apparent from the accompanying drawings and the following detailed description of the preferred embodiments.

BRIEF DESCRIPTION OF THE DRAWINGS

FIG. 4a is a graph showing an illustrative AC signal that may be generated by the signal generator of FIG. 3 in accordance with the present invention.

FIGS. 4b and 4c show the AC waveforms that are produced at nodes A and B in FIG. 3 in accordance with the present invention.

DETAILED DESCRIPTION OF THE PREFERRED EMBODIMENTS

The AC circuitry of the present invention may be used whenever AC signals are needed. For example, the AC circuitry of the present invention may be used in test and measurement applications or may be used to control any suitable mechanical, electrical, or optical components. For illustrative purposes, aspects of the present invention are described in the context of using the AC circuitry to provide AC drive signals for microelectromechanical system (MEMS) devices such as those used in switches, dynamic spectral filter modules, optical amplifiers with dynamic gain equalization capabilities, and other optical network equipment in fiber-optic communications networks.

Figure 1:
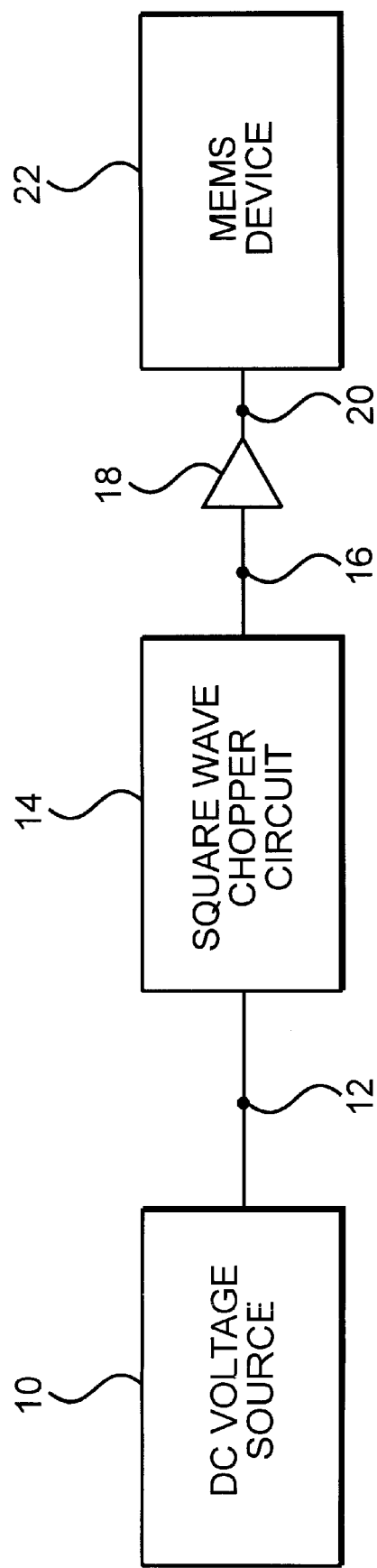
FIG. 1 is a schematic diagram of a conventional AC drive circuit arrangement for controlling the operation of a MEMS device.

A schematic diagram of a conventional MEMS AC drive circuit arrangement is shown in FIG. 1. A DC voltage source 10 produces a voltage of a controllable magnitude at node 12. A switching circuit 14 is used to form a chopper that creates a square wave at output 16. The amplitude of the square wave is the same as the amplitude of the DC voltage produced at node 12. An amplifier 18 is used to increase the amplitude of the AC voltage signal at node 16. The amplified signal is provided to node 20 for use in driving MEMS device 22. Typically, the amplified signal at node 20 is applied to device 22 through a capacitor (i.e., the signal is AC coupled) to help reduce DC leakage signals that would otherwise lead to an undesirable build-up of a voltage offset in MEMS device 22. The arrangement of FIG. 1 can be used to produce a number of drive signals in parallel to control different elements in the MEMS device.

The frequency of the square wave produced at node 16 is typically 1 MHz. Because devices such as device 22 generally have a low capacitance and a high impedance, simply AC coupling the output of amplifier 18 to device 22 is not sufficient to ensure stable long-term operation due to leakage through the coupling capacitor. It is also necessary to ensure that the signal at node 20 is symmetrical about 0 V. Because of these constraints, amplifier 18 is provided with positive and negative power supplies and the power consumption of amplifier 18 is fairly high. With this type of arrangement, amplifier 18 produces relatively large output voltages at fairly high frequencies while maintaining a zero average DC output voltage. However, the arrangement of FIG. 1 may exhibit a relatively high power consumption and may be fairly complex due to the need for multiple power supplies.

Figure 2:
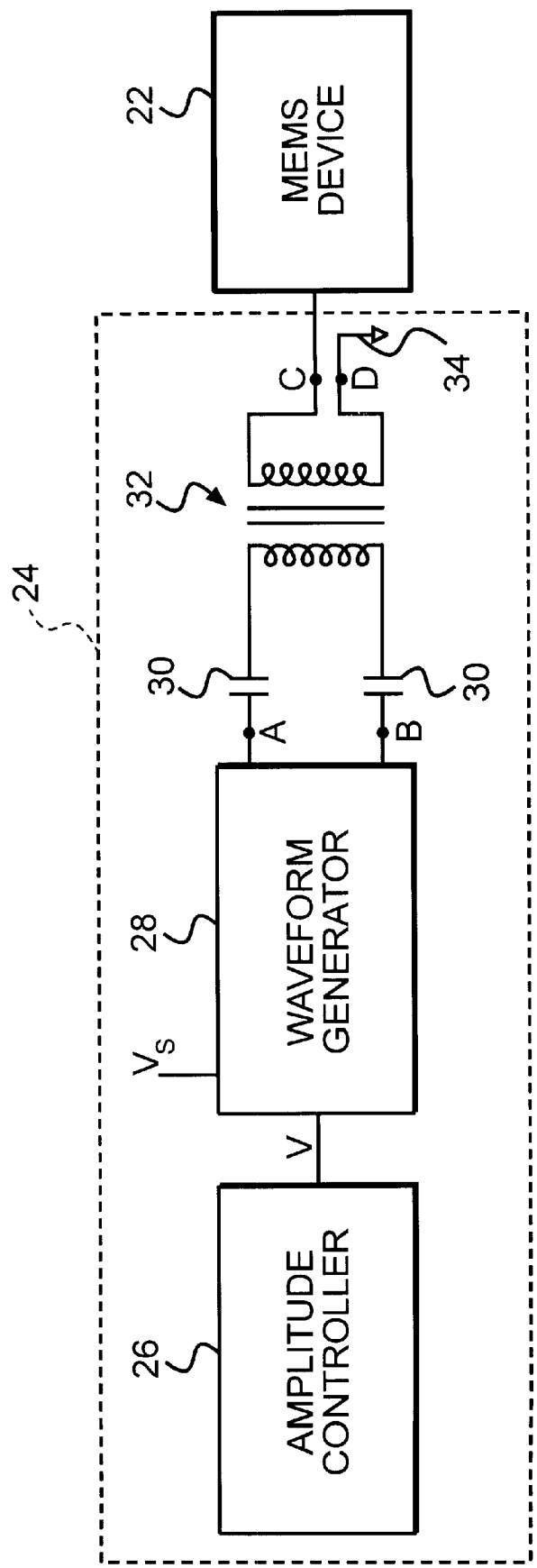
FIG. 2 is a schematic diagram of an illustrative AC drive circuit arrangement for controlling the operation of a MEMS device in accordance with the present invention.

An AC drive circuit 24 in accordance with the present invention is shown in FIG. 2. Circuit 24 may produce an AC drive signal for MEMS device 22. The AC drive signal may be symmetric around 0 V, so that there is no net accumulation of charge on the elements within MEMS device 22, which may reduce drift effects.

Amplitude controller 26 may be used to control the amplitude of the AC voltage that is produced by circuit 24. Waveform generator 28 may be used to produce the AC signal having the amplitude that is controlled by amplitude controller 26. For example, waveform generator 28 may be used to generate complementary 1 MHz square wave outputs at terminals A and B that each have an amplitude that is controlled by the magnitude of a DC output voltage produced by amplitude controller 26. The signals from the output of waveform generator 28 at nodes A and B may be provided to transformer 32 through capacitors 30 (i.e., the output of generator 28 may be AC coupled to transformer 32).

Because waveform generator 28 is AC coupled to transformer 32, waveform generator 28 need only use one positive supply voltage $V_s$. The use of the complementary outputs of nodes A and B reduces the turns ratio needed in transformer 32 to produce a sufficient amplitude to drive MEMS device 22.

Capacitors 30 and transformer 32 have associated parasitic resistances. The magnitude of these resistances is typically quite large (e.g., on the order of megaohms). The AC signal at node A and the signal at node B each vary between a voltage V and a voltage of 0 V. Accordingly, the average DC voltage is V/2 at each of these nodes. These DC voltages produce a DC leakage currents that travel from nodes A and B through capacitors 30 and transformer 32 to ground terminal 34. However, because the parasitic resistances associated with capacitors 30 and transformer 32 are so large and because the resistance of the secondary of transformer 32 is relatively small (e.g., on the order of ohms), the DC voltage offset that is induced in the secondary of transformer 32 and that is provided to MEMS device 22 is generally extremely small. In particular, this DC bias is generally much lower than the DC offset of amplifier 18 in the conventional design of FIG. 1.

Figure 3:
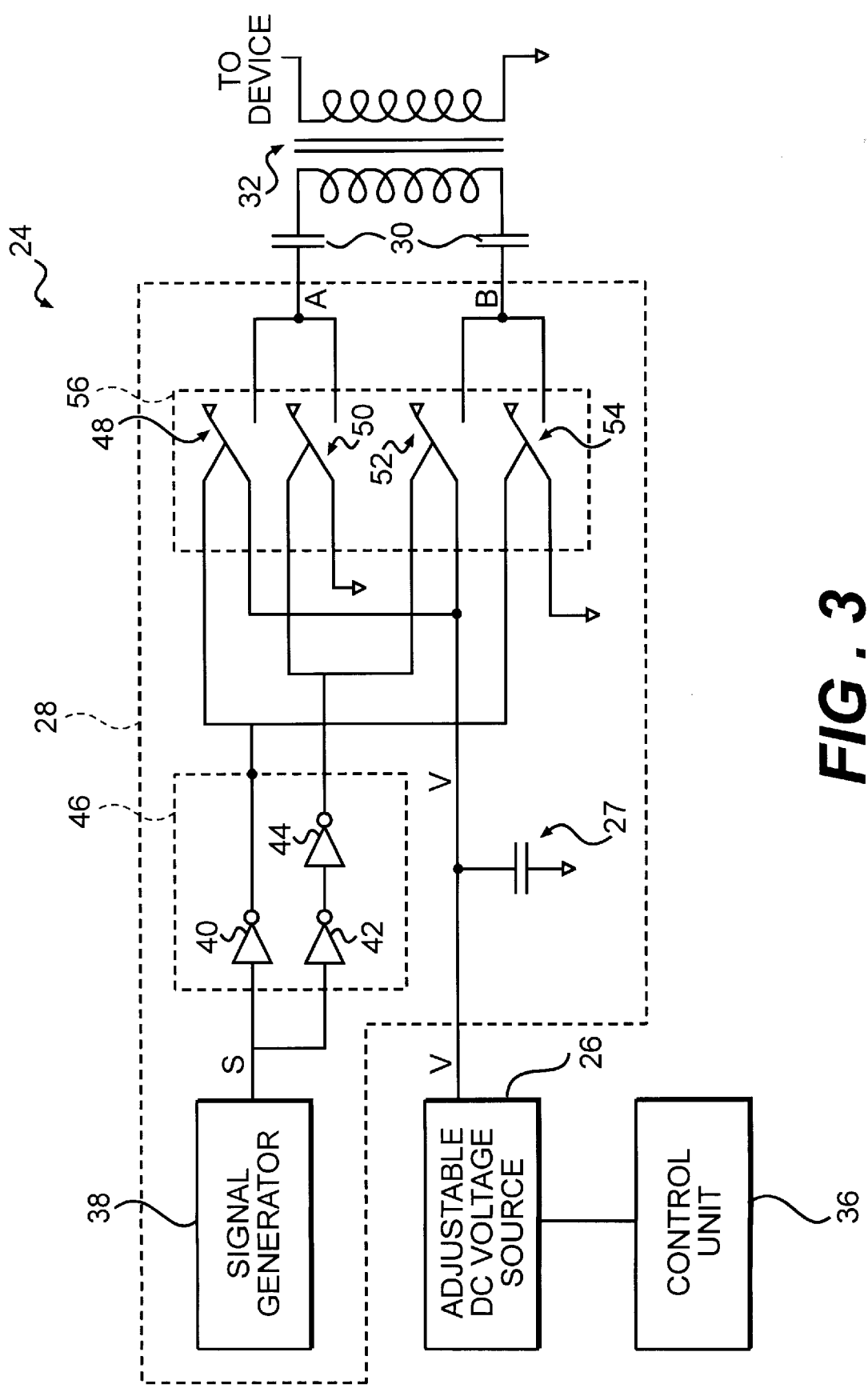
FIG. 3 is a more detailed diagram of an illustrative AC drive circuit arrangement in accordance with the present invention.

An illustrative embodiment of the AC drive circuit 24 of FIG. 2 is shown in FIG. 3. In the illustrative configuration of FIG. 3, a controllable DC voltage V is produced by adjustable DC voltage source 26 in response to commands provided by control unit 36. The voltage V is low-pass-filtered using capacitor 27. Control unit 36 may be based on any suitable control electronics and may include one or more microprocessors, microcontrollers, digital signal processors, field-programmable gate arrays or other programmable logic devices, application-specific integrated circuits, digital-to-analog converters, analog-to-digital converters, analog control circuits, memory devices, etc.

Waveform generator 28 has a signal generator 38 that generates a digital signal S such as a square wave clock signal at a frequency of 1 MHz or any other suitable frequency. The signal S is shown in FIG. 4a. The signal S is inverted by inverter 40 to produce a corresponding inverted version of the signal and is twice inverted (i.e., is buffered) by inverters 42 and 44 to produce a corresponding noninverted version of the signal. Inverters 40, 42, and 44 may be part of an integrated circuit, as indicated by dotted lines 46.

The outputs of inverters 40 and 44 are complementary square waves that are used to drive switches 48, 50, 52, and 54. Switches 48, 50, 52, and 54 may be field-effect transistor switches or other suitable switches that are part of the same integrated circuit or device, as shown by dotted line 56. Either the switches of switch pair 48 and 52 are closed or the switches of switch pair 50 and 54 are closed. When switches 48 and 52 are closed, the voltage V is applied to terminal A and terminal B is grounded. When switches 50 and 54 are closed, the voltage V is applied to terminal B and terminal A is grounded. The signals on terminals A and B as a function of the clock signal S are shown in FIGS. 4b and 4c, respectively. Capacitors 30 and transformer 32 are used to provide the AC voltage signal at terminals A and B to MEMS device 22.

Figure 5:
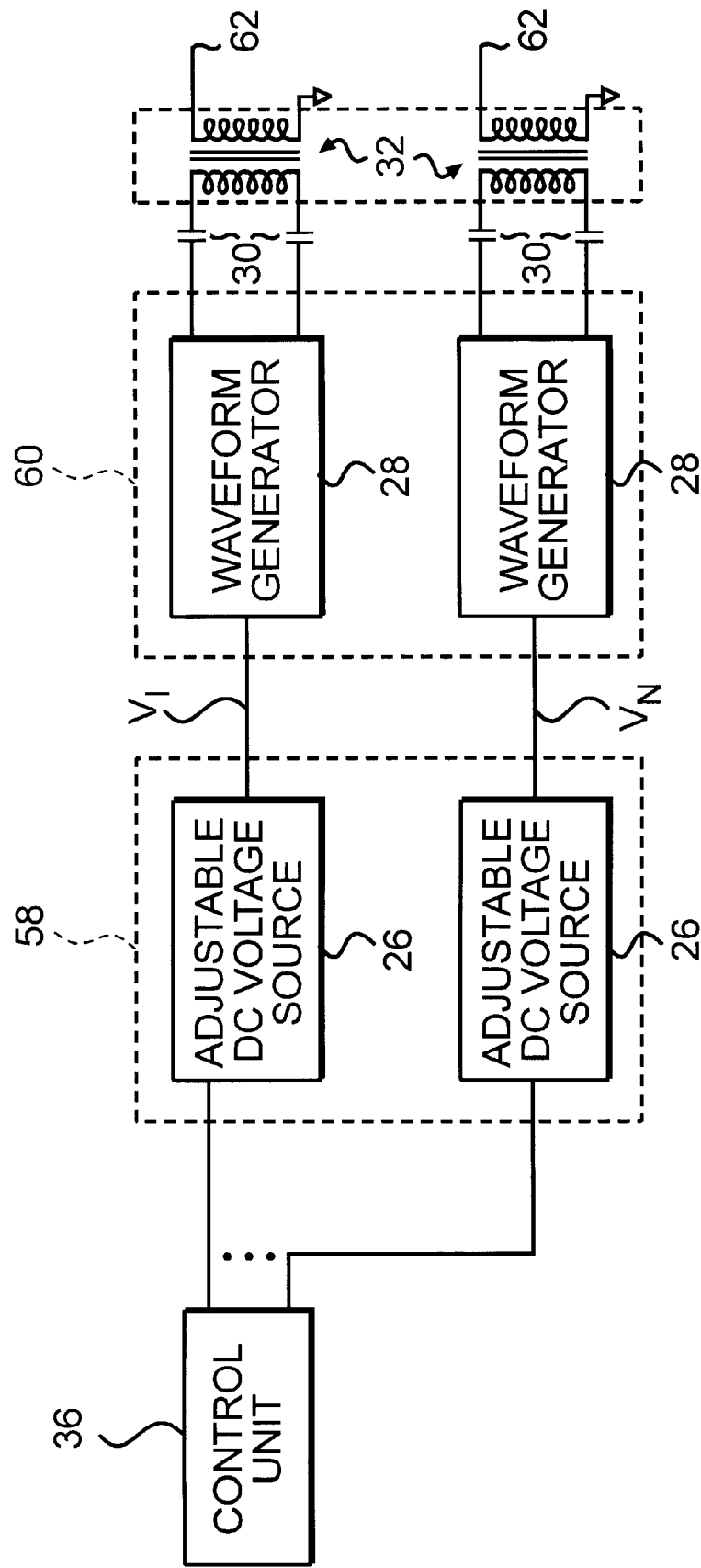
FIG. 5 is a circuit diagram showing illustrative AC drive circuitry that may be used to produce multiple AC drive signals in accordance with the present invention.

As shown in FIG. 5, control unit 36 may control a number of adjustable DC voltage sources 26 in parallel. The DC voltage sources 26 may, for example, be based on a multiport digital-to-analog converter or multiple digital-to-analog converters or other suitable voltage source circuitry. The DC voltage sources 26 may, if desired, be part of the same device, as indicated by dotted line 58.

The adjustable DC control voltages $V_1 \ldots V_N$ that are produced at the outputs to source circuitry 26 may be provided to respective waveform generators 28. Waveform generator circuits 28 may be provided as part of the same integrated circuit or circuits, as shown by dotted line 60. The outputs of waveform generator circuitry 28 may be AC coupled to transformers 32 using capacitors 30. Each transformer 32 may boost a respective AC output signal from one of waveform generators 28 and may apply the boosted signal to a respective movable or controllable element in a MEMS device 22 as a drive signal via a respective output 62.

If desired, one, some, or all of the transformers 32 may be housed in the same package. In general, transformers 32 may be small enough to fit within one or more surface mount packages.

Figure 6:
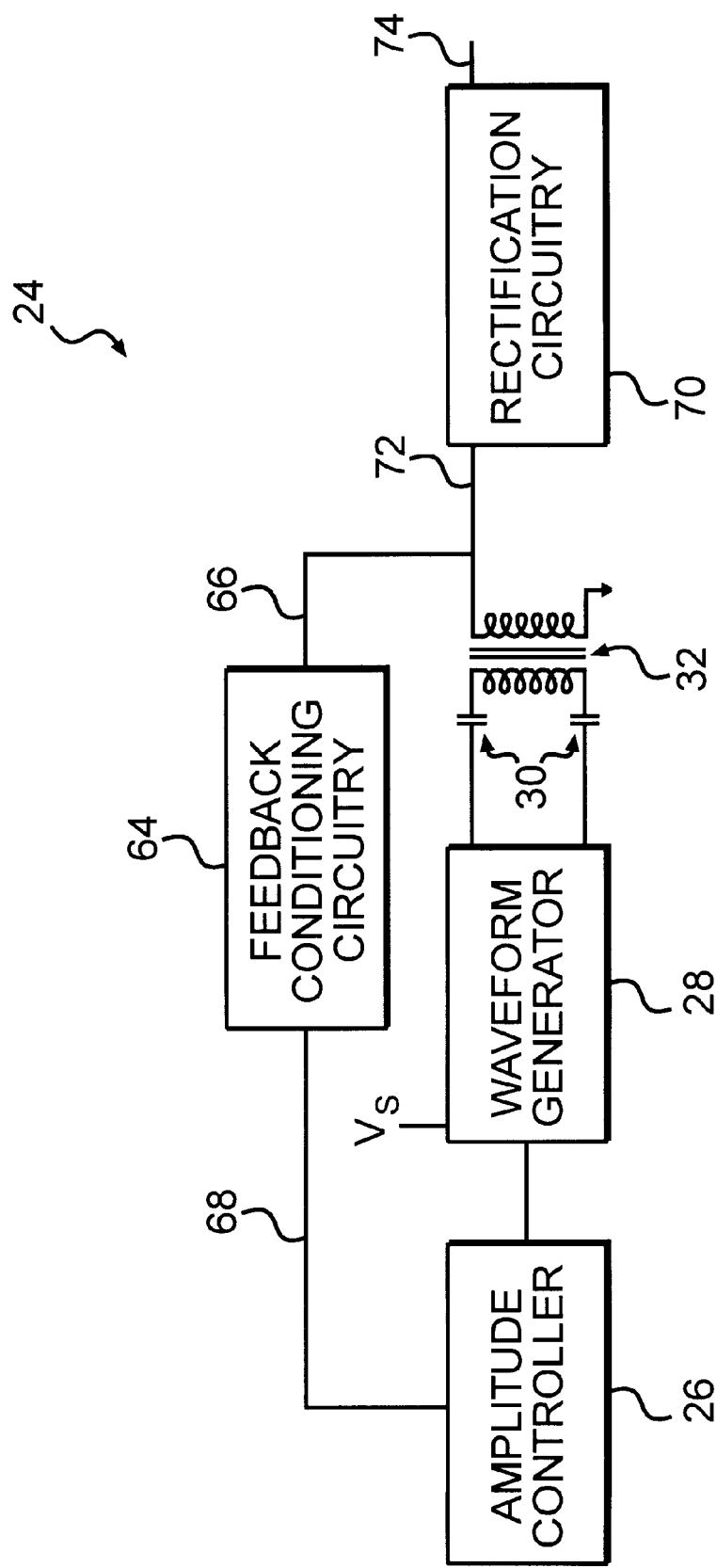
FIG. 6 is a diagram showing how feedback circuitry may be used to stabilize the operation of the AC drive circuitry and showing how rectification circuitry may be used to convert an AC drive signal into a DC drive signal in accordance with the present invention.

As shown in FIG. 6, circuitry 24 may include feedback conditioning circuitry 64 for stabilizing the operation of circuitry 24. A feedback signal may be tapped from the output 72 of transformer 32 using path 66. Feedback conditioning circuitry 64 may include filtering circuitry for rectifying the tapped signal and for reducing noise. Feedback conditioning circuitry 64 may also include amplifier circuitry or other suitable circuitry for adjusting the offset and amplitude of the rectified and filtered feedback signal. Path 68 may be used to provide the resulting conditioned feedback signal to amplitude controller 26 for use as a feedback control signal. This arrangement may help to maintain the amplitude of the AC signal that is provided at output 72 at a desired level.

If desired, circuitry 24 (with or without feedback conditioning circuitry 64) may be provided with rectification circuitry 70. Rectification circuitry 70 may be based on any suitable rectifier arrangement. For example, rectification circuitry 70 may be based on a half-wave or full-wave rectifier. Rectification circuitry 70 may be used to rectify the AC signal supplied on path 72. The resulting DC voltage signal on output 74 may be used as a drive signal for a MEMS device 22 that uses DC drive voltages.

It will be understood that the foregoing is merely illustrative of the principles of this invention, and that various modifications can be made by those skilled in the art without departing from the scope and spirit of the invention.

What is claimed is:

1. Circuitry that produces AC drive signals that control a microelectromechanical systems device, comprising:
   amplitude control circuitry that produces a DC voltage;
   waveform generator circuitry that uses the DC voltage to produce an AC waveform across at least two nodes;
   coupling capacitors coupled to each of the nodes; and
   a transformer having two primary terminals each of which is connected to a respective one of the coupling capacitors and having two secondary terminals at which the AC drive signals for controlling the microelectromechanical systems device are produced, wherein the transformer boosts the AC waveform to produce the AC drive signals.

2. The circuitry defined in claim 1 wherein the amplitude control circuitry produces a plurality of individually controlled DC voltages, wherein the waveform generator uses each of the DC voltages to produce a respective AC waveform, and wherein the circuitry includes multiple coupling capacitors and transformers for boosting each of the respective AC waveforms into a corresponding AC drive signal for a different element within the microelectromechanical systems device.

3. The circuitry defined in claim 1 wherein the amplitude control circuitry produces a plurality of individually controlled DC voltages, wherein the waveform generator uses each of the DC voltages to produce a respective AC waveform, wherein the circuitry includes multiple coupling capacitors and transformers for boosting each of the respective AC waveforms into a corresponding AC drive signal for a different element within the microelectromechanical systems device, and wherein the transformers are housed in at least one surface mount package.

4. The circuitry defined in claim 1 further comprising a control unit that controls the amplitude of the DC voltage produced by the amplitude control circuitry.

5. The circuitry defined in claim 1 wherein the waveform generator circuitry includes a signal generator that generates a square wave clock signal.

6. The circuitry defined in claim 1 wherein the AC drive signals have a frequency of above 100 kHz.

7. The circuitry defined in claim 1 wherein the AC drive signals have a frequency of 1 MHz.

8. The circuitry defined in claim 1 wherein the waveform generator circuitry includes a signal generator that generates a square wave clock signal and inverter circuitry that receives the square wave clock signal and produces a corresponding noninverted version of the square wave clock signal and a corresponding inverted version of the square wave clock signal.

9. The circuitry defined in claim 1 wherein the waveform generator circuitry includes a signal generator that generates a square wave clock signal, inverter circuitry that receives the square wave clock signal and produces a corresponding noninverted version of the square wave clock signal and a corresponding inverted version of the square wave clock signal, and switch circuitry responsive to the noninverted version of the square wave clock signal and the inverted version of the square wave clock signal to produce the AC waveform from the DC voltage.

10. The circuitry defined in claim 1 wherein the waveform generator circuitry includes a signal generator that generates a square wave clock signal, inverter circuitry that receives the square wave clock signal and produces a corresponding noninverted version of the square wave clock signal and a corresponding inverted version of the square wave clock signal, and switch circuitry including field-effect transistor switches that are responsive to the noninverted version of the square wave clock signal and the inverted version of the square wave clock signal to produce the AC waveform from the DC voltage.

11. The circuitry defined in claim 1 wherein the transformer is housed in a surface mount package.

12. The circuitry defined in claim 1 wherein the DC voltage is low-pass-filtered by a capacitor.

13. The circuitry defined in claim 1 further comprising feedback conditioning circuitry that provides a feedback signal from the transformer to the amplitude control circuitry.

14. Circuitry that produces AC signals, comprising:
    amplitude control circuitry that produces a DC voltage;
    waveform generator circuitry that uses the DC voltage to produce an AC waveform across at least two nodes;
    coupling capacitors coupled to each of the nodes; and
    a transformer having two primary terminals each of which is connected to a respective one of the coupling capacitors and having two secondary terminals at which the AC signals are produced, wherein the transformer boosts the AC waveform to produce the AC signals.

15. The circuitry defined in claim 14 wherein the amplitude control circuitry produces a plurality of individually controlled DC voltages, wherein the waveform generator uses each of the DC voltages to produce a respective AC waveform, and wherein the circuitry includes multiple coupling capacitors and transformers for boosting each of the respective AC waveforms into a corresponding AC signal.

16. The circuitry defined in claim 14 wherein the amplitude control circuitry produces a plurality of individually controlled DC voltages, wherein the waveform generator uses each of the DC voltages to produce a respective AC waveform, wherein the circuitry includes multiple coupling capacitors and transformers for boosting each of the respective AC waveforms into a corresponding AC signal, and wherein the transformers are housed in at least one surface mount package.

17. The circuitry defined in claim 14 further comprising a control unit that controls the amplitude of the DC voltage produced by the amplitude control circuitry.

18. The circuitry defined in claim 14 wherein the waveform generator circuitry includes a signal generator that generates a square wave clock signal.

19. The circuitry defined in claim 14 wherein the AC signals have a frequency of above 100 kHz.

20. The circuitry defined in claim 14 wherein the AC drive signals have a frequency of 1 MHz.

21. The circuitry defined in claim 14 wherein the waveform generator circuitry includes a signal generator that generates a square wave clock signal, inverter circuitry that receives the square wave clock signal and produces a corresponding noninverted version of the square wave clock signal and a corresponding inverted version of the square wave clock signal, and switch circuitry responsive to the noninverted version of the square wave clock signal and the inverted version of the square wave clock signal to produce the AC waveform from the DC voltage.

22. The circuitry defined in claim 14 further comprising feedback conditioning circuitry that provides a feedback signal from the transformer to the amplitude control circuitry.

23. The circuitry defined in claim 14 further comprising rectification circuitry that rectifies the AC signals.

* * * * *